INVENTORS
Harry G. Tatosian
Robert A. Yohai
BY
ATTORNEY

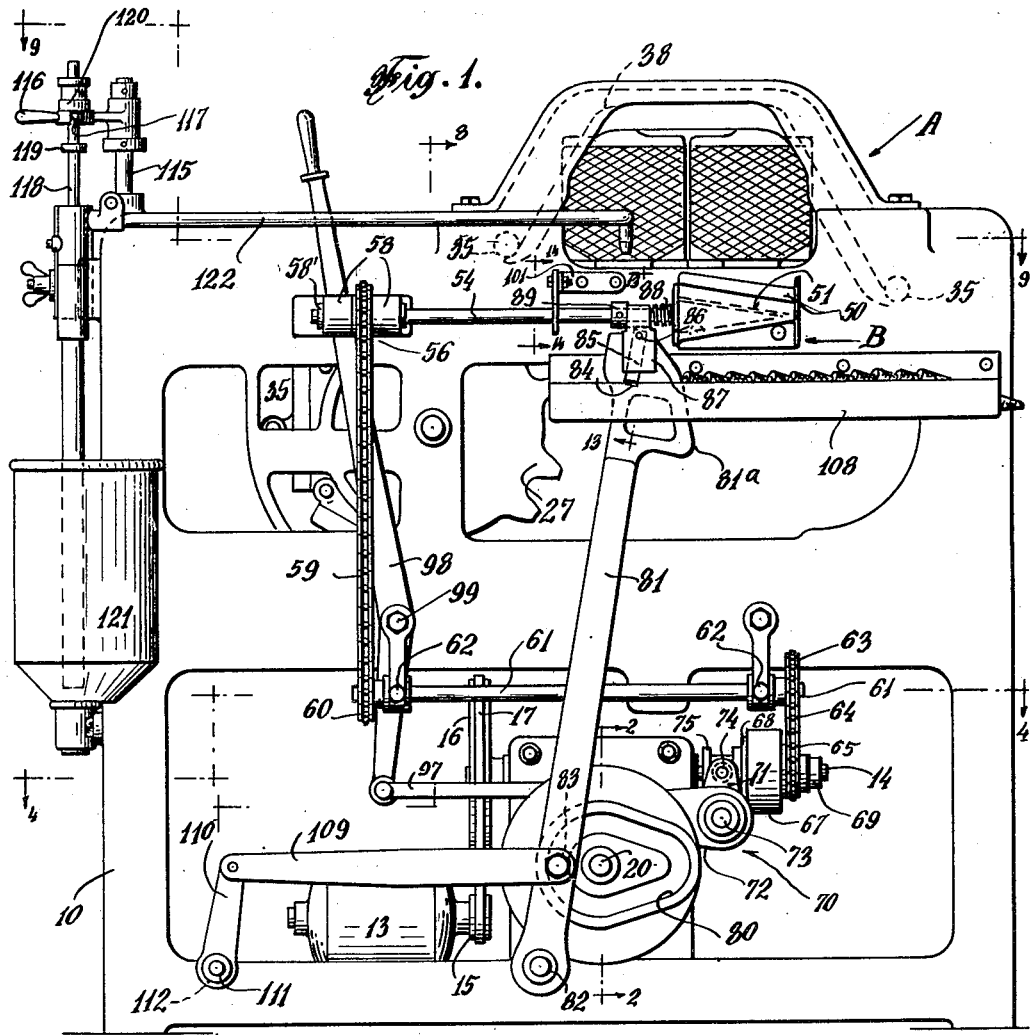
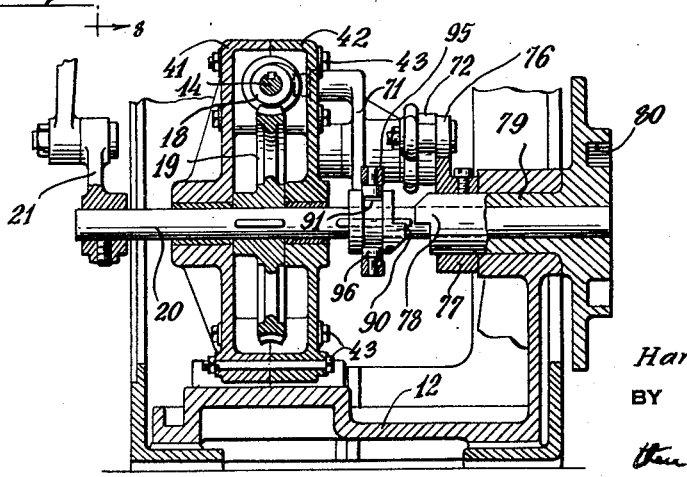

Sept. 3, 1940.  R. A. YOHAI ET AL  2,213,727
MACHINE FOR MAKING SUGAR CONES
Filed July 30, 1938  6 Sheets-Sheet 3

INVENTORS
Harry G. Tatosian
Robert A. Yohai
BY
their ATTORNEY

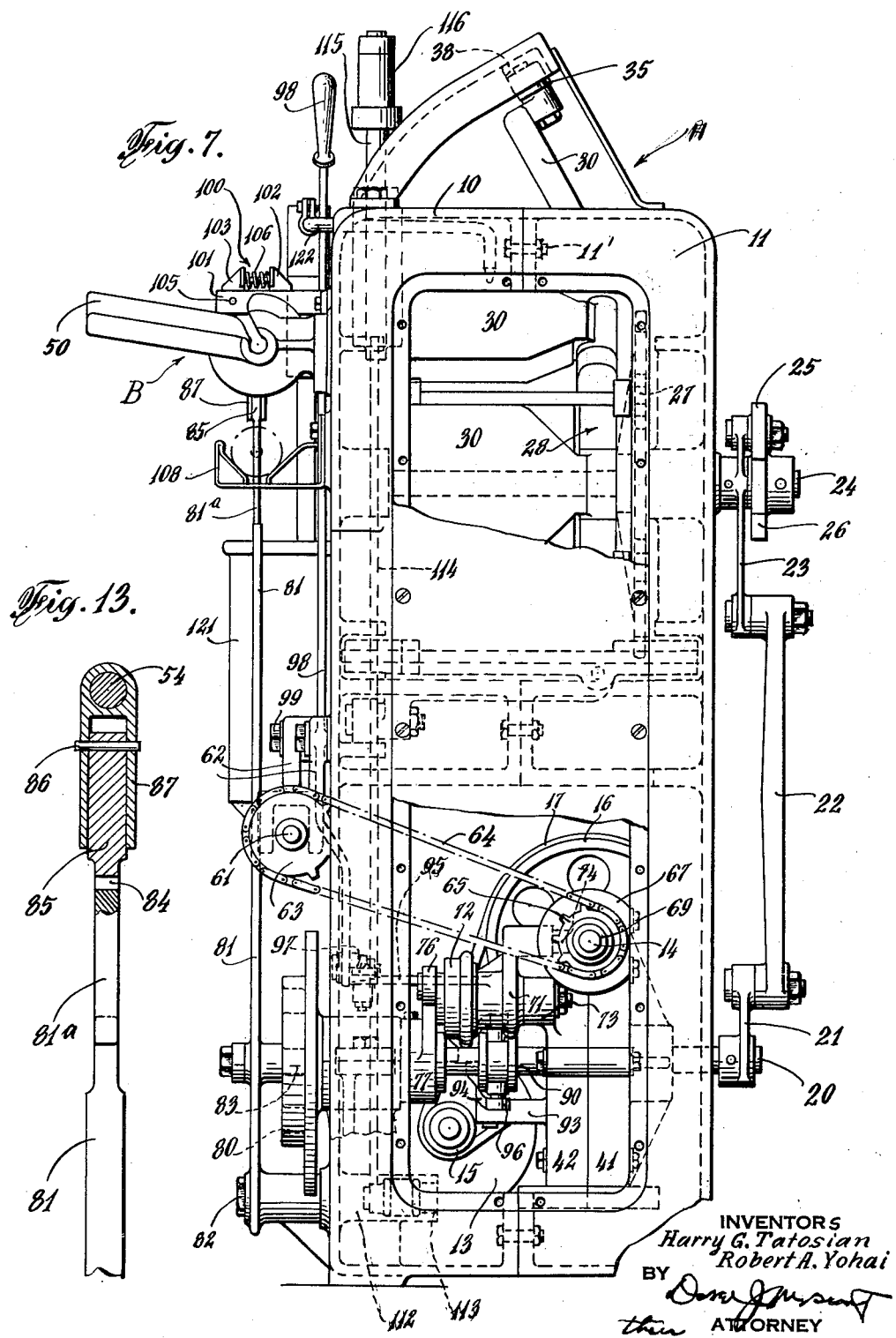

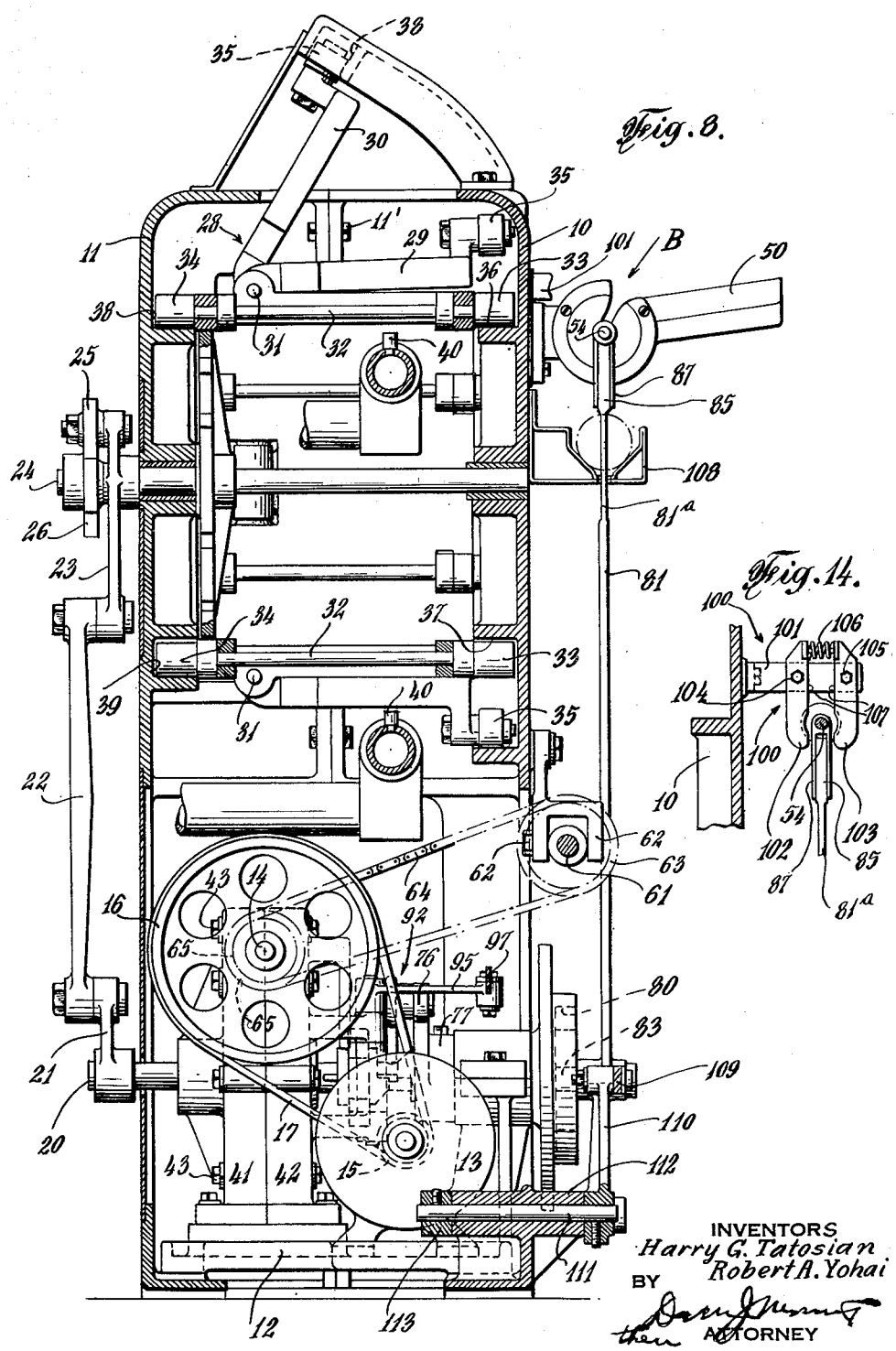

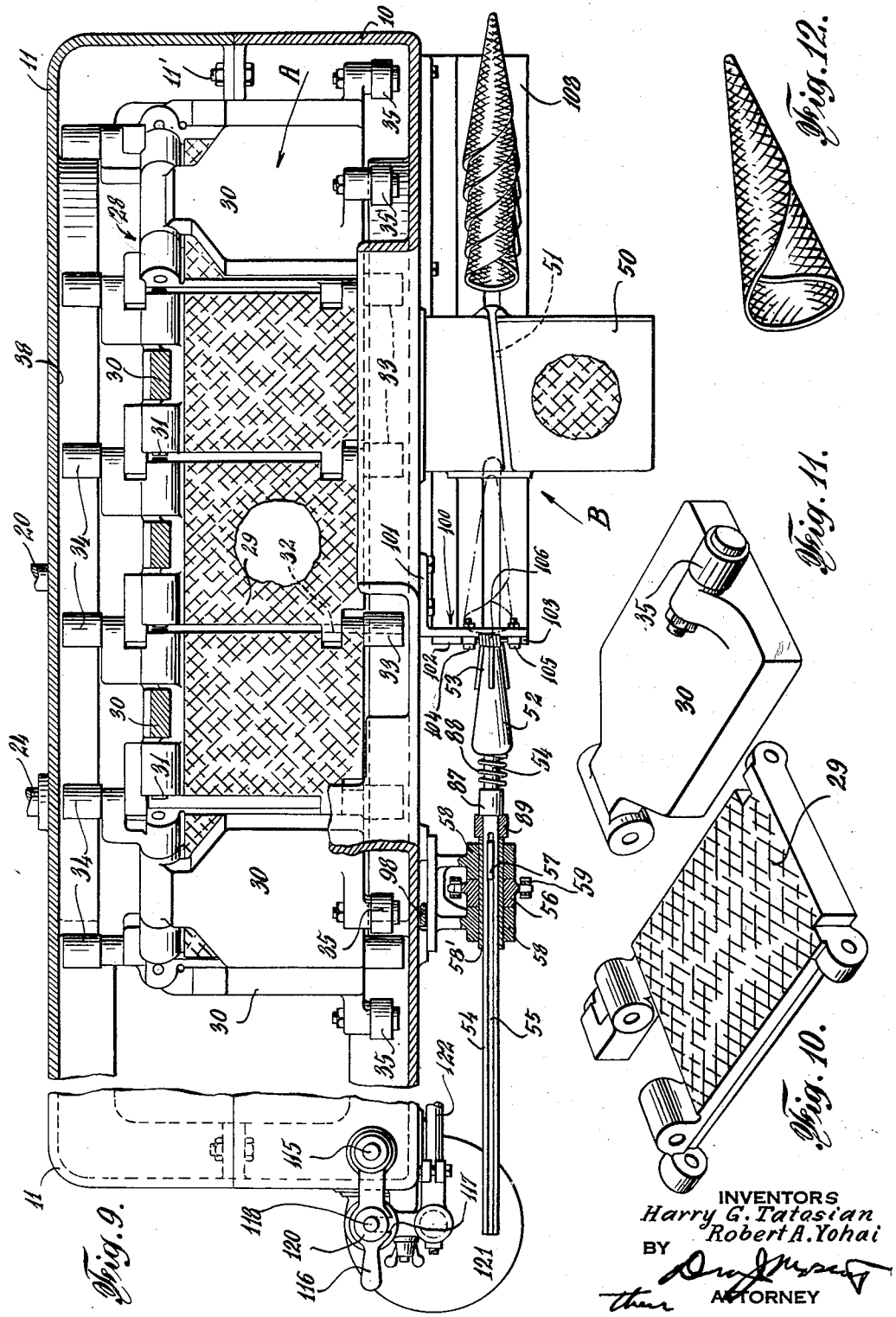

Patented Sept. 3, 1940

2,213,727

UNITED STATES PATENT OFFICE

2,213,727

MACHINE FOR MAKING SUGAR CONES

Robert A. Yohai and Harry G. Tatosian, New York, N. Y., assignors, by mesne assignments, to Sugar Shell Corporation, New York, N. Y., a corporation of New York Application July 30, 1938, Serial No. 222,096

10 Claims. (Cl. 107—58)

This invention relates to an improved machine for forming rolled sugar cones, being particularly directed to a compactly designed assembly displacing the separate large units heretofore used.

Generally, this invention involves in a compact apparatus the synchronization of batter cake baking and cone shaping or rolling operations, the entire production cycle of such apparatus in the respective baking and rolling units being controllable from a common power source.

Still further, it is an object of this invention to provide, in an apparatus for producing sugar cones, a feed mchanism operable to deliver batter to a baking iron, a drive mechanism for progressively displacing the baking irons to form plastic edible batter cakes, and a shaping or rolling mechanism acting on the batter cakes to impart a conical formation thereto, all such mechanisms being operable from a common driving source through synchronized controls.

A specific object of this invention is to provide a novel control for the cone shaping or forming mechanism incorporating an assembly involving a plurality of clutches, one of which, when placed in operation, automatically controls the actuation of the other, whereby to perform to completion, upon each rotation, a predetermined operation in the cycle of such mechanism.

Other obvious advantages of our invention will become apparent as the description thereof proceeds. We do not wish to be limited to the exact structural details herein disclosed, but all equivalents as might fall within the scope of the appended claims are meant to be included.

In the drawings:

Figure 1 is a front elevation of the machine.

Figure 2 is an end elevation partly in section taken along lines 2—2 of Figure 1.

Figure 7 is an end elevation looking towards the right of Figure 1.

Figure 8 is an end elevation partly in section taken along lines 8—8 of Figure 1.

Figure 9 is a plan view partly in section taken along lines 9—9 of Figure 1.

Figure 10 is a perspective view of a baking plate in the bottom baking plate series.

Figure 11 is a perspective view of a top plate in the baking plate series.

Figure 12 is a perspective view of a cone baked and rolled on the machine.

Figure 13 is an end elevation partly in section taken along lines 13—13 of Figure 1.

Figure 14 is an end elevation partly in section taken along lines 14—14 of Figure 1.

The machine comprises two main portions, the baking portion A and the cone forming portion B. Both of these are mounted on a single housing structure and supporting means which comprises front and rear side walls 10, 11 joined together by bolts 11'. At the bottom of this housing structure on a base 12 is mounted the single power drive 13 for operating both the baking griddles in a step by step motion and the cone forming portion of the machine by means of various clutches, cams and levers all to be later described.

Figure 5:
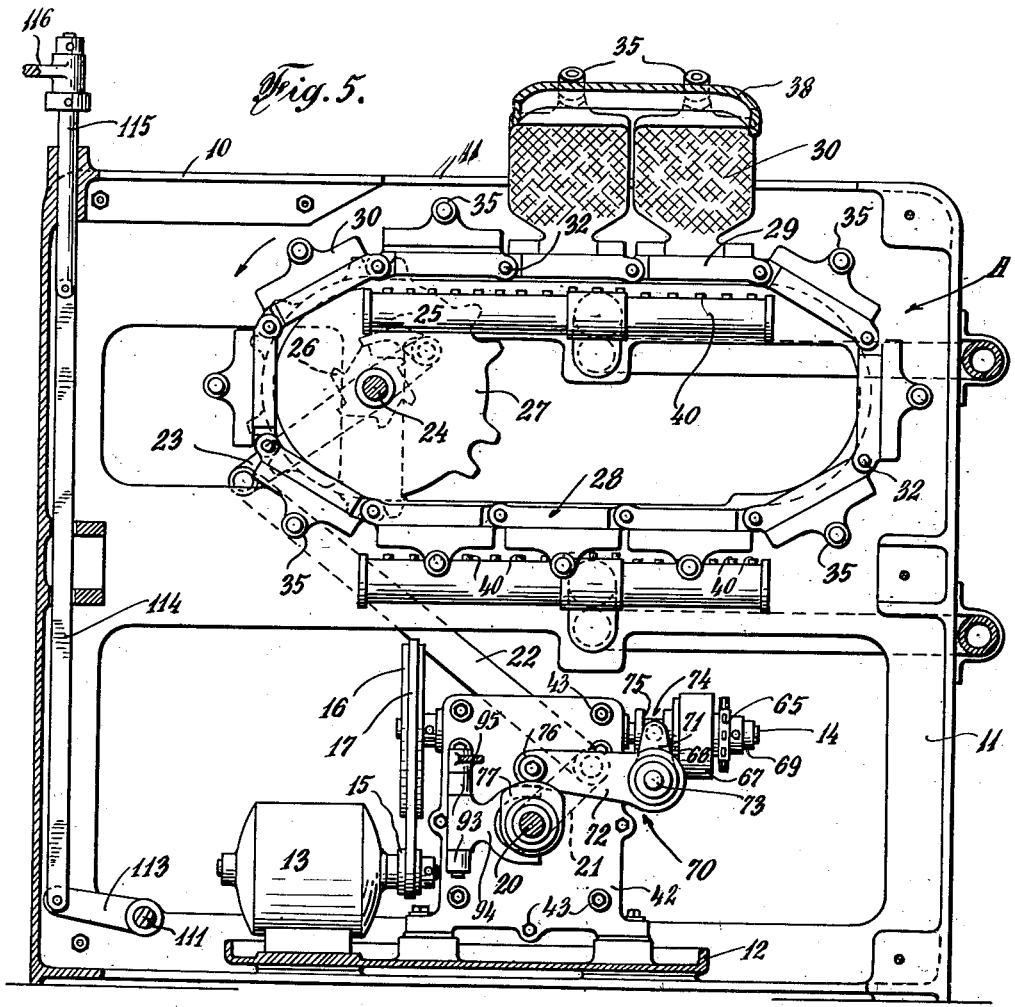
Figure 5 is a front elevation in section taken along lines 5—5 of Figure 3.
Figure 6:
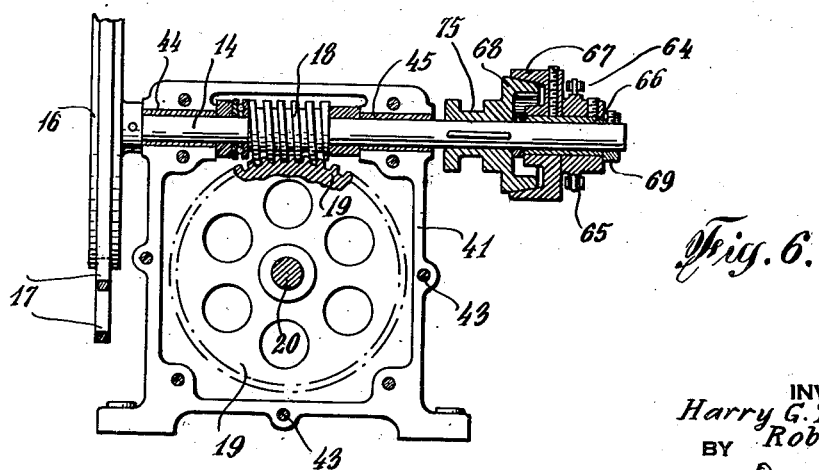
Figure 6 is a front elevation in section taken along lines 6—6 of Figure 4.

Referring to Figures 5 and 6, the motor 13 drives the worm shaft 14 by way of pulleys 15, 16 and belt 17. The worm 18 on shaft 14 drives the worm wheel 19 fixed to shaft 20.

The worm and wheel drive structure is enclosed in a two part housing 41, 42, held together by bolts 43 (Figure 2). The shaft 14 is mounted in bearings 44, 45 at the joining line of parts 41 and 42.

At one end of shaft 20 is fixed a crank arm 21 to rotate therewith and to the end of this crank arm is pivoted one end of a link 22. The other end of link 22 is pivotally connected to one end of another link 23 which is rotatably mounted intermediate its ends on a shaft 24. The other end of link 23 pivotally carries a pawl 25 which cooperates with a ratchet 26 fixed to shaft 24. To this shaft is also fixed the sprocket wheel 27 for driving the baking griddles in a step by step motion by means of the chain structure 28 to which the baking griddles are attached.

The baking portion of the machine consists of a series of lower irons 29 and upper opening and closing irons 30. Each set of irons of the series are pivoted on pins 31 to form a hinge-like structure for each griddle. The lower irons 29 are hingedly joined together along adjacent sides by pins 32 (Figure 5) to make the endless chain-like structure generally designated as 28.

The ends of pins 32 are provided with rollers 33 and 34 which act as cam followers to guide the lower plates 29 as they are moved by the sprocket wheel and each of the upper plates has a roller 35, extending from the free end thereof. These rollers and roller cooperate with cam grooves 36, 37 in side wall 10 and 38, 39 in side wall 11 of the housing structure (Figure 8).

Grooves 36, 37 are wide enough in cross section to accommodate rollers 33 and 34 of the lower plate and roller 35 of the upper plate to thereby keep the griddle in closed position during baking.

At the point where the required amount of baking is completed another cam structure 38 is provided to cooperate with roller 35 of the upper plate to lift that plate for the removal of the baked batter cake forming a cone blank and to hold it open a sufficient length of time to allow supply of batter for baking of another cone blank. The batter supply structure will be later described. The baking griddles are heated in a usual way by gas jets 40.

It now becomes apparent that upon each revolution of the worm wheel 19 which is driven from the motor 13 by elements 14, 15, 16, 17 and 18 the baking griddles are advanced one unit by way of elements 21, 22, 23, 24, 25, 26 and 27.

This completes the baking structure. The batter cake or cone blank which is removed from this baking machine is supplied to the cone forming machine now to be described.

The method of cone forming used in this machine is of course well known in the art. The batter cake or cone blank upon removal from the baking iron is sufficiently plastic to be easily workable and yet it is not sticky nor is it too brittle.

Numeral 50 represents the feed table where the cone blank in plastic form is fed to the cone forming unit. This portion of the machine comprises a female slotted mold member 51 of conical shape and a shaper in the form of a mandrel 52 reciprocable and rotatable thereon. Spaced teeth 53 extending along the face of the shaper are provided for gripping the cone blank in the process of formation of the cone. Shaper 52 is integral with shaft 54, which is driven by mechanisms to be described, to give a rotating and reciprocating motion thereto.

Shaft 54 is provided with a long slot 55 for cooperating with a sprocket wheel 56, sleeve 56' and key 57 fixed to the latter, to rotatively drive shaft 54 and yet allow reciprocating sliding motion thereof. The sprocket wheel 56 is mounted as by force fit on sleeve 56' between the two bearings 58 (Figure 9), which provide a support for the shaft 54. Chain 59 and sprocket wheel 60 on shaft 61 drive the shaft 54 in a rotary motion. Shaft 61 is rotatably mounted in hanging bearings 62, and has another sprocket wheel 63 at its other end. A chain 64 drives shaft 61 by way of sprocket wheel 65 which is fixed to a sleeve 66 to which is also fixed one element 67 of a clutch member. This sleeve 66 is rotatably mounted on the other end of the worm shaft 14 (Figure 6). The other clutch element 68 is slidably keyed to shaft 14. A stop member 69 is fixed to shaft 14 to prevent sleeve 66 from slipping off the shaft.

A bell crank 70 having arms 71 and 72 is pivoted in a lug 73 extending from any suitable part of the drive housing parts 41, 42. The arm 71 of the bell crank has a pin 74 cooperating with a spool portion 75 of the clutch element 68. Arm 72 has a roller 76 at its end to cooperate with a cam 77.

By this means the clutch is engaged at the proper time, as determined by the cam 77 to drive shaft 61 and thereby drive shaft 54 in a rotary motion. To simultaneously give a reciprocating motion to shaft 54 the following mechanism is provided:

The shaft 20 has rotatably mounted thereon at its other end, one element 78 of a clutch integral with a sleeve 79 (Figure 2). Also integral with sleeve 79 and outside of side wall 10 of the frame is a cam 80. An upright lever 81 pivoted at 82 in the bottom of side wall 10 has a follower 83 cooperating with cam 80 to give an oscillating motion to the lever.

Lever 81 is provided at its upper end with a slot 84 (Figures 1 and 13) in which is slidable a block 85. This block is pivotally mounted on a pin 86 which has bearings in the two arms of a forked member 87. This forked member has a circular opening for slidably receiving the shaft 54 of the cone shaper.

On the shaft 54 at one side of the member 87 is a spring 88 abutting it and the cone shaper 52 and at its other side is a stop member 89 locked to shaft 54 (Figure 1).

The other part of the clutch on shaft 20 comprises a splined sleeve clutching element 90 rotatable with and slidable on shaft 20. A spool portion 91 on element 90 provides a means whereby it may be reciprocated by a suitable mechanism to engage and disengage the clutch element 78.

Figure 3:
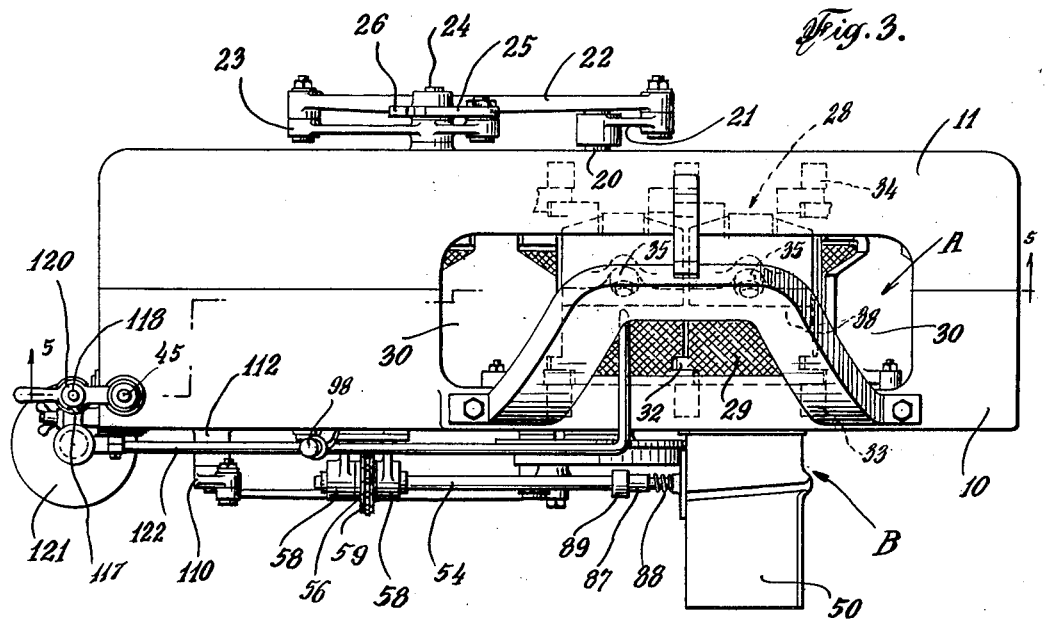
Figure 3 is a plan view of the machine.
Figure 4:
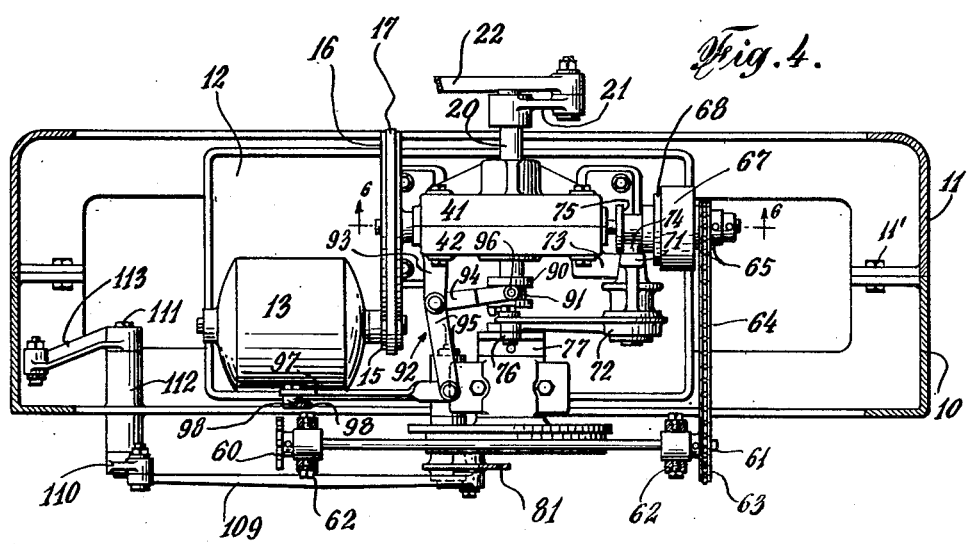
Figure 4 is a plan view in section along lines 4—4 of Figure 1.

The bell crank 92 (Figure 4) pivoted in lug 93 has arms 94 and 95. Arm 94 ends in a fork which straddles the spool 91. Rollers 96 at the fork ends engage the spool sides to operate the clutch element 90. The arm 95 of the bell crank is pivotally connected at its end to a link 97 which, in turn, is pivotally connected to an end of the operating lever 98 which is pivoted at 99.

As will be seen from Figure 2, the cam 77 is locked to sleeve 79 to rotate therewith.

The operation of the cone forming portion of the machine now becomes clear. When lever 98 is operated, the clutch elements 90 and 78 are engaged causing rotation of sleeve 79 and cams 80 and 77. Cam 80 causes reciprocation of the cone shaping member 52 by way of lever 81 and its associated mechanism. Cam 77 operates bell crank 70 to engage clutch elements 67 and 68 to rotatably drive cone shaper shaft 54. The cams 77 and 80 are so designed relative to each other to give a predetermined amount of rotation to the cone shaper for each reciprocation thereof.

For stripping of the cone from the cone shaper a suitable cone releasing structure 100 is mounted on a bracket 101 attached to the frame structure. This is shown in detail by Figure 14 and comprises arms 102 and 103 pivoted at intermediate points to the bracket 101 at 104 and 105. A spring 106 at one side of the pivots and stops 107 at the opposite side cooperate with the arms to complete the cone removing structure. The arms are suitably shaped and the stops so spaced that they cooperate with the cone to remove it from the cone shaper as it moves towards the left (Figure 1). The spacing of the arms allows the shaper to pass, but prevents the cone from passing.

Upon removal by the stripper the cone drops into a tray 108 which is fixed to the frame and, upon the next forward motion by the lever 81, is pushed forward by a tapered protruding member 81a (Figure 1) at the upper part of lever 81, into nesting relationship within the previously deposited cone.

In order to provide for the formation of a new cone blank in the baking portion of the machine for each cone rolled on the cone shaping portion of the machine, the batter injection structure for supplying the baking griddles is synchronized with the cone shaping machine.

A link 109 is connected to the lever 81 to be operated thereby. This link operates a crank arm 110 fixed to shaft 111 mounted in bearing 112. A lever 113 fixed to the other end of the shaft operates an upright connecting rod 114 which reciprocates a pump operating rod 115. A hand lever 116 fixed to rod 115 has a slot 117 to fit around the pump piston 118. Adjustable stops 119 and 120 on piston 118 cooperate with lever 116 to transmit the motion from 115 to 118. The pump delivers batter from tank 121 to pipe 122 to deposit the proper amount of batter on the baking griddles.

Upon each rotation of cam 80 and therefore upon each cycle of operation of the cone shaper, an injection of batter is supplied to the baking griddle for a new cone blank.

In operation, the actuation of lever 98 engages the clutch elements 90 and 78 to continuously rotate cams 77 and 80. Upon each revolution the cam 80 acts on lever 81 to reciprocate the cone shaping tool 52 into member 51 and back again. Simultaneously the cam 77 acts on bell crank 70 to engage clutch elements 67 and 68 to cause rotation of shaft 54 of the cone shaper by way of the chain drives 64 and 59 and then to disengage said clutch. Shaft 20 at the side opposite to clutch elements 78, 90 continuously drives the baking griddles 29, 30 in a step by step motion (Figure 5) in synchronism with the operation of the cone forming structure, one step for each rotation of the shaft. Also simultaneously with each reciprocation of lever 81 the batter pump makes an injection of dough to the empty griddle from which a baked cone blank had been previously removed.

Once the machine is set in operation it is continuous. The only manual operation is the removal of the baked cone blank from the griddle and feeding it to the cone shaper.

We claim:

1. In a device of the character described, the combination of a baking machine, a shaping machine operative in synchronism with said baking machine and a batter supplying means operative from an element of said shaping machine.

2. In a device of the character described, the combination of a baking machine, a shaping machine having a shaping tool, means for simultaneously operating both machines in synchronism, means for setting the said shaping tool in operation to produce one motion thereof, and means operative by said first motion producing means to simultaneously give a second motion to said shaping tool.

3. In a device of the character described, the combination of a baking machine and shaping machine arranged on a single frame structure, a single driving means for both machines, said baking machine operative in a step by step motion, said shaping machine operative in synchronism with the step by step motion of said baking machine, a shaping tool, means to reciprocate said shaping tool, means controlled by said first means to cause simultaneous rotation of said shaping tool, and means operative by said reciprocating means to supply batter to said baking machine.

4. In a device of the character described, the combination of a baking machine and shaping machine arranged on a single frame structure, a single driving means for both machines, said baking machine operative in a step by step motion, said shaping machine operative in synchronism with the step by step motion of said baking machine, a shaping tool, means to reciprocate said shaping tool, means controlled by said first means to cause simultaneous rotation of said shaping tool, means forming a rolled cone by the operation of said shaping tool, means for releasing said cone from said shaping tool, means operated by said reciprocating means for conveying and nesting the said cone from the machine and means operated by said reciprocating means for supplying batter to said baking machine.

5. In a device of the character described, the combination of a baking machine and shaping machine arranged on a single frame structure, a single driving means for both machines, said baking machine operative in a step by step motion to produce plastic batter cakes, said shaping machine operative in synchronism with the step by step motion of said baking machine, a shaping tool, means to reciprocate said shaping tool and means controlled by said first means to cause simultaneous rotation of said shaping tool, thereby to form a rolled cone by the operation of said shaping tool on said batter cakes, and means for supplying batter to the baking machine, controlled by the the operating means of the shaping tool and in synchronism therewith.

6. In a device of the character described, the combination of a baking machine and shaping machine combined in one, a cone shaping tool, a cone structure formed from a baked batter cake by said shaping tool, a single driving means for the combined machine, means to reciprocate and rotate said cone shaping tool, means to convey a shaped cone structure in nested formation from the machine, and means to supply batter to said baking machine, said batter supply means operative from the reciprocating means of the cone shaping tool, all of said operating means acting in synchronism to perform a complete operation cycle and all being actuated from said single driving means.

7. In a device of the character described, the combination of a baking machine and cone shaping machine combined in one, means operative in synchronism and for the performance of a complete cycle of operation to shape a cone from a plastic batter cake, release it from the shaper, convey it from the machine and supply a predetermined quantity of batter to the baking machine for a new batter cake, the batter supply means being operative from the cone shaping tool operating means.

8. In a device of the character described, the combination of a baking machine and a cone shaping machine combined in one, means for baking a batter cake, means for shaping the batter cake to form a cone, after removal from the baking machine, and means operative from said cone shaping means and in synchronism therewith to supply batter to the baking machine for the baking of a new batter cake for each cone shaped.

9. In a device of the character described, the combination of a baking machine and a cone shaping machine combined in one and operative in synchronism with each other, a cone shaping tool, means to drive said tool in a reciprocating motion, means to simultaneously drive said tool in a rotating motion, and means set in motion by one of said driving means for said tool to effect operation of the other of said driving means.

10. In a device of the character described, the combination of a baking machine and a cone shaping machine combined in one and operative in synchronism with each other, a cone shaping tool, means to drive said tool in a reciprocating motion, means to simultaneously drive said tool in a rotating motion, and means set in motion by said reciprocating driving means to effect operation of said rotating driving means.

HARRY G. TATOSIAN.
ROBERT A. YOHAI.